(12) United States Patent
Chirol et al.

(10) Patent No.: US 10,479,617 B2
(45) Date of Patent: Nov. 19, 2019

(54) SORTING CENTER ARCHITECTURE INCLUDING A LOOPED CONVEYOR

(71) Applicant: Solystic, Bagneux (FR)

(72) Inventors: Luc Chirol, Paris (FR); Emmanuel Miette, Saint Gratien (FR)

(73) Assignee: Solystic (FR)

(*) Notice: Subject to any disclaimer, the term of this patent is extended or adjusted under 35 U.S.C. 154(b) by 0 days.

(21) Appl. No.: 16/149,394

(22) Filed: Oct. 2, 2018

(65) Prior Publication Data
US 2019/0100388 A1    Apr. 4, 2019

(30) Foreign Application Priority Data

Oct. 3, 2017 (FR) ...................... 17 59245

(51) Int. Cl.
*B65G 47/71* (2006.01)
*B65G 47/52* (2006.01)
*B65G 47/46* (2006.01)
*B07C 3/08* (2006.01)

(52) U.S. Cl.
CPC ................ *B65G 47/71* (2013.01); *B07C 3/08* (2013.01)

(58) Field of Classification Search
None
See application file for complete search history.

(56) References Cited

U.S. PATENT DOCUMENTS 6,978,192 B2 * 12/2005 Wisniewski ............. B07C 3/02
                                                        198/347.1
2007/0203612 A1    8/2007 Mileaf

FOREIGN PATENT DOCUMENTS

EP     3 147 038 A1    3/2017
WO      01/10574 A1    2/2001

* cited by examiner

*Primary Examiner* — Kavel Singh
(74) *Attorney, Agent, or Firm* — Ware, Fressola, Maguire & Barber LLP

(57) ABSTRACT

A logistics installation (200) for sorting articles, the installation including a looped conveyor (210) comprising P pre-sorting devices (PT1, PT2) for pre-sorting the articles, injection zones (ZI-1, ZI-2, ZI-3, ZI-4, ZI-5, ZI-6) for injecting the pre-sorted articles onto the conveyor, and outlet zones (ZS-1, ZS-2, ZS-3, ZS-4, ZS-5, ZS-6) for unloading the articles from the conveyor, the injection zones alternating with the outlet zones along the conveyor, each injection zone being followed by an outlet zone, in which installation each injection zone is connected to one pre-sorting device only, and each pre-sorting device is connected to one in every P injection zones considered sequentially around the conveyor.

12 Claims, 4 Drawing Sheets

SORTING CENTER ARCHITECTURE INCLUDING A LOOPED CONVEYOR

CROSS REFERENCE TO RELATED APPLICATION

This application claims priority under 35 USC § 119 to French Patent Application No. 1759245 filed on Oct. 3, 2017, which application is hereby incorporated by reference in its entirety.

TECHNICAL FIELD

The invention relates to the field of transport and delivery logistics, and more precisely to the field of sorting infrastructures for sorting articles such as letters or parcels.

PRIOR ART

In the field of logistics, the efficiency of sorting centers is crucial for reasons of speed of processing, in order to satisfy demand and in order to make the facilities profitable.

Sorting centers include conveyor devices. Increasing the throughput rates of such devices is limited by dynamic constraints: the accelerations and speeds that are possible are limited by the need to keep the articles on said conveyor devices.

Therefore, seeking to increase throughput rates leads not only to increasing the sizes of sorting centers in order to increase their capacities, but also to considering solutions that optimize their architectures and their modes of use with a view to limiting their footprints, and their costs while also improving their efficiencies.

A sorting centre may be constructed around a looped conveyor that conveys articles in series. European Patent EP 3 147 038 and US Patent 2007/0203612 describe architectures and modes of use for sorting centers that enable such conveyors to be used efficiently, those conveyors being subdivided into injection zones alternating with outlet zones.

Articles arriving at the sorting center are placed on the looped conveyor while it is moving at the injection zones before being steered towards an outlet of an outlet zone.

The articles are sorted upstream from the looped conveyor, or "pre-sorted", the injection zone of a given article being determined by its destination (delivery address) or by any other sorting criterion, such as its shape or its weight. When the conveyor includes two injection zones and two sorting zones, such an arrangement makes it possible to inject the articles onto locations on the conveyor via a first injection zone upstream from the outlet zone via which they are to be unloaded from the conveyor, and to vacate the locations before they go past the second injection zone.

In that way, each location on the conveyor can be used once only in each injection zone. When the articles are separated into two pre-sorted streams, each location can be used twice on each lap.

SUMMARY OF THE INVENTION

An object of the invention is to optimize the efficiency with which a looped conveyor of a sorting center is used by means of an article-sorting infrastructure combining pre-sorting devices that can process the articles received at the sorting center, in parallel with injecting the articles into a topology in which the injection points where the pre-sorted articles are injected by various pre-sorting devices are interleaved, or alternated.

More specifically, and independently for a plurality of article-receiving zones, each of which comprises, for example, one or more unloading bays where articles to be sorted are unloaded from delivery trucks, a sorting infrastructure of the invention makes it possible to separate articles to be sorted arriving at said article-receiving zones and to convey them to injection zones of a looped conveyor that alternate with outlet zones of the conveyor around the loop formed by said conveyor.

To this end, the invention provides a logistics installation for sorting articles, the installation including a looped conveyor capable of directing the articles into sorting outlet zones according to a sorting plan that associates the outlet zones with the articles, the looped conveyor having injection zones, each of which is arranged to inject the articles onto the conveyor and which alternate with the outlet zones, said logistics installation being characterized in that it further includes:

a certain number P of pre-sorting devices designed for pre-sorting the articles to be sorted according to said sorting plan, P being an integer greater than or equal to two; and conveyor lines for conveying the pre-sorted articles from the pre-sorting devices to the injection zones, the conveyor lines being arranged so that each injection zone is connected to only one pre-sorting device and each pre-sorting device is connected to a plurality of injection zones in a configuration in which each pre-sorting device is connected to one in every P injection zones considered sequentially around the conveyor in a given direction.

With this infrastructure architecture and knowing in advance the articles to be sorted and the sorting information associated with said articles, it is possible to optimize use of the conveyor by distributing the stream of articles towards the injection zones and the outlet zones in a balanced manner.

In particular, in accordance with the invention, a monitoring and control unit may be provided that is arranged to act on the basis of advance knowledge of the articles to be sorted and of the sorting information associated with said articles to compute an optimized distribution for the pre-sorted articles in the conveyor lines in such a manner as to balance the article throughput rates between the outlet zones while also imposing a constraint whereby an article injected onto the conveyor from a given pre-sorting device connected to a plurality of injection zones via the corresponding conveyor lines, which article is injected onto the conveyor from a certain injection zone connected to said given pre-sorting device, is unloaded from the conveyor before going through another injection zone that is connected to said given pre-sorting device.

The invention may advantageously also have the following features:

the sorting information is constituted by delivery addresses;

the looped conveyor is made up of subdivisions that are connected together end-to-end, each subdivision including the same number of injection zones and of outlet zones, the injection zones of each subdivision being collectively connected to each of the article-receiving zones via the conveyor lines;

each pre-sorting device is designed to separate the non-sorted articles into Q streams of pre-sorted articles conveyed by the conveyor lines, where Q is an integer greater than or equal to 2, the looped conveyor includes I injection zones, where I=P×Q, the injection zones being numbered from 1 to I and being disposed in that order around the conveyor in a direction S of rotation of the conveyor, and a stream numbered q, where q lies in the range 1 to Q, goes from a pre-sorting device numbered p, where p lies in the range 1 to P, and leads to the injection zone i, where i=p+(P×(q−1));
the looped conveyor is a platform conveyor; and
the articles are mailpieces or parcels.

BRIEF DESCRIPTION OF THE DRAWINGS

The present invention can be better understood and other advantages appear on reading the following detailed description of an embodiment given by way of non-limiting example and with reference to the accompanying drawings, in which.

DESCRIPTION OF AN EMBODIMENT

An object of the invention is to improve the efficiency of a sorting center by increasing the operational throughput rate Do of a looped conveyor that depends: i) on the mechanical throughput rate Dm of the conveyor, which throughput rate is set by its physical characteristics (dimensions, and speed); and ii) on the number of times a location of the conveyor is used on each lap, which number is represented by the multiplier M.

The operational throughput rate Do is defined as the mechanical throughput rate Dm of the conveyor multiplied by the multiplier M: Do=Dm×M. M is an operational value that depends on the mode of use of the conveyor, and it is not a value set merely by the topology of the elements of the sorting center.

M depends both on the architecture of the center and also on the way in which said center is operated. To achieve its object, the invention uses an architecture making it possible to obtain multipliers M that are significantly higher than those that can be obtained with conventional architectures.

This makes it possible to increase the operational capacity of the conveyor with mechanical characteristics that remain constant.

Method of Calculating the Multiplier M

Figure 1A:
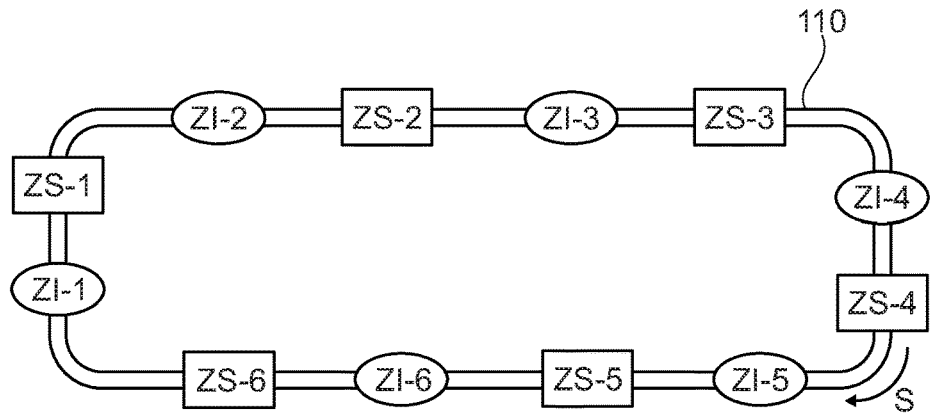
FIG. 1A shows an architecture of a sorting installation having a looped conveyor and including injection zones alternating with outlet zones.

In order to analyze the multipliers of a given architecture, it is necessary to describe formally a system including a looped conveyor having n injection zones alternating with the same number of outlet zones. FIG. 1A shows an example of such a configuration for n=6. The looped platform conveyor 110 rotates in the rotation direction S.

The injection zones and the outlet zones are represented by ZI and ZS, respectively, numbered 1 to 6, and distributed around the loop formed by the conveyor with increasing numbers in the rotation direction S.

In this system, let:
M be the multiplier of the system;
d(i) be the maximum possible injection throughput rate in the injection zone i (where i lies in the range 1 to n); and
α(i,j) be the proportion of the stream of articles injected via the injection zone i that is to go to the outlet zone j (where j lies in the range 1 to n).

We then have:

$$\forall i, \sum_{j=1}^{n} \alpha(i, j) = 1$$

$$M = \left( \sum_{i=1}^{n} \frac{[d(l)]}{D_m} = \sum_{i=1}^{n} \frac{d(l)}{D_m} \right]$$

The coefficients α(i,j) are operating data for operating the system: they depend on the structures of the streams processed and on how they are distributed between the outlet zones. For optimum use of the conveyor, the operations of the system should be configured to distribute the volumes equally between the various outlet zones, and the following is then obtained:

$$\forall i \text{ and } \forall j, \quad \alpha(i, j) = \frac{1}{n}$$

An assessment of the traffic at each point $P_j$ situated between the injection zone j and the outlet zone j, where j lies in the range 1 to n, may be established.

The platforms of the sorter are occupied by the articles injected at each injection zone i (from 1 to n) when said platforms have not yet been vacated on going past $P_j$. Let o(i,j) be the proportion of the platforms that are loaded at the injection zone i and that are still occupied on going past point $P_j$. By definition:

$$\forall j, o(j,j)=1$$

since, at $P_j$, a platform has just gone past the injection zone j and no article injected via said injection zone onto said platform has yet been unloaded towards an outlet of the sorter. The coefficients o(i,j), where i≠j, are expressed as a function of α(i,j) by the following relationships:

If $j = 1$ $\quad o(i, j) = \sum_{k=1}^{n} \alpha(i, k)$

If $1 < j < i$ $\quad o(i, j) = \sum_{k=1}^{n} \alpha(i, k) + \sum_{k=1}^{j-1} \alpha(i, k)$ If $i < j$ $\quad o(i, j) = \sum_{k=1}^{j-1} \alpha(i, k)$ The maximum throughput rate of the system is reached when the throughput rate of the sorter is at its maximum after each injection zone (at each point $P_j$ below).

A system of n equations is established in which the unknowns are d(j), where j lies in the range 1 to n, and in which the coefficients are constructed with the α(i,j) input parameters of the system:

$$\forall i, \sum_{j=1}^{n} o(i, j) \cdot d(j) = D_m$$

or indeed $$\forall i, \sum_{j=1}^{n} o(i, j) \cdot \frac{d(j)}{D_m} = 1$$

The multiplier M is fully determined by the matrix A of α(i,j) values. In the particular case of FIG. 1A, with the assumption that the articles are distributed equally in the outlet zones regardless of their injection zones, each coefficient α(i,j) is equal to 1/6 and the matrix A is expressed by $$A = \begin{bmatrix} \frac{1}{6} & \frac{1}{6} & \frac{1}{6} & \frac{1}{6} & \frac{1}{6} & \frac{1}{6} \\ \frac{1}{6} & \frac{1}{6} & \frac{1}{6} & \frac{1}{6} & \frac{1}{6} & \frac{1}{6} \\ \frac{1}{6} & \frac{1}{6} & \frac{1}{6} & \frac{1}{6} & \frac{1}{6} & \frac{1}{6} \\ \frac{1}{6} & \frac{1}{6} & \frac{1}{6} & \frac{1}{6} & \frac{1}{6} & \frac{1}{6} \\ \frac{1}{6} & \frac{1}{6} & \frac{1}{6} & \frac{1}{6} & \frac{1}{6} & \frac{1}{6} \\ \frac{1}{6} & \frac{1}{6} & \frac{1}{6} & \frac{1}{6} & \frac{1}{6} & \frac{1}{6} \end{bmatrix}$$

Solving this system of equations gives d(1)=d(2)=d(3)=d(4)=d(5)=d(6)=2D/7 and M=1.714. In this example, a platform receiving an article that is injected in the injection zone 1 and that is unloaded in the outlet zone 6, i.e. in the situation that applies to one in every six articles, is used once only in the lap; similarly, a platform receiving an article injected in the injection zone 1 and unloaded in the outlet zone 1 is used at least twice.

Separation Into Pre-Sorted Streams

The method in Patent Document EP 3 147 038 for increasing the multiplier M is based on an architecture that makes it possible to separate articles arriving at an article-receiving zone upstream from a looped conveyor.

The arriving articles are separated into n pre-sorted streams of identical sizes that are to go to n corresponding outlet zones of a looped conveyor via n corresponding injection zones of the conveyor, each of the injection zones being situated between two adjacent outlet zones.

In this method, all of the articles that are injected via the same injection zone are removed from the conveyor via the same outlet zone.

Figure 1B:
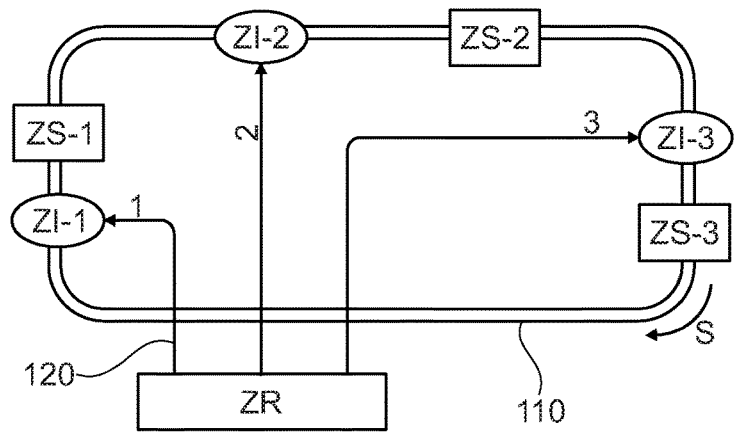
FIG. 1B shows an architecture of a sorting installation with a looped conveyor that can be used with a method of separating the articles to be sorted into streams of pre-sorted articles.

FIG. 1B shows this method for n=3. Articles collected in an article-receiving zone ZR are separated into three streams 120 of pre-sorted articles that are to go to respective ones of three injection zones ZI, ZI-1, ZI-2 and ZI-3, via conveyor lines (not shown in the figure).

The pre-sorting is performed in such a manner that each location of the conveyor that is loaded via an injection line ZI is vacated at an outlet zone before being presented to the following injection zone ZI. More precisely, the articles are pre-sorted in such a manner that an article that is to go to an outlet of the outlet zone i is injected onto the conveyor via the injection zone i, which is situated upstream from and contiguous to the outlet zone i, when i is equal to 1, 2, or 3.

With the above formalism, the matrix A can be expressed by $$A = \begin{bmatrix} 1 & 0 & 0 \\ 0 & 1 & 0 \\ 0 & 0 & 1 \end{bmatrix}$$

and the multiplier M1 is equal to 3. Thus, each platform of the conveyor may be used up to three times on each lap. In the general case when n is arbitrary, M is equal to n.

Interleaving of the Injection Zones and of the Outlet Zones

Another architecture consists in feeding a conveyor via at least two article-receiving zones in parallel, and in interleaving, or alternating, the outlet zones and the corresponding injection zones.

Figure 1C:
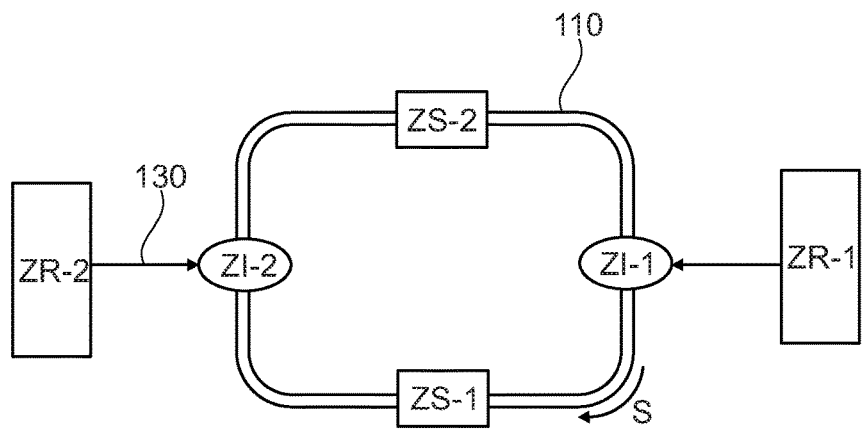
FIG. 1C shows an architecture of a sorting installation having a looped conveyor that can be used with a method of interleaving injection zones and outlet zones for articles to be sorted that are received at two article-receiving zones.

Such an architecture is shown by FIG. 1C for the situation with two article-receiving zones ZR in parallel, namely ZR-1 and ZR-2, and two outlet zones ZS, namely ZS-1 and ZS-2. The articles that are collected are transferred in streams 130 to go to two injection zones ZI, namely ZI-1 and ZI-2.

In an ideal situation, in which the articles (without pre-sorting) are naturally distributed between each of the outlet zones independently of their article-receiving zone, equal distribution of the articles between the injection zones and between the outlet zones is obtained.

With the above formalism, the matrix A can be expressed by:

$$A = \begin{bmatrix} \frac{1}{2} & \frac{1}{2} \\ \frac{1}{2} & \frac{1}{2} \end{bmatrix}$$

and the multiplier M3 is equal to 4/3.

Combining Pre-Sorting with Interleaving

An object of the invention is to combine the method of separating the streams with the method of interleaving the injection zones and the outlet zones of a plurality of article-receiving zones, in such a manner as to combine the advantages, and the multipliers M, of each of the methods. The inventors have devised an architecture that makes this combination possible.

In accordance with the invention, a logistics installation for processing articles to be sorted includes a looped conveyor for conveying articles to be sorted according to a looped circulation plan, the conveyor including as many injection zones as it does outlet zones.

Figure 2:
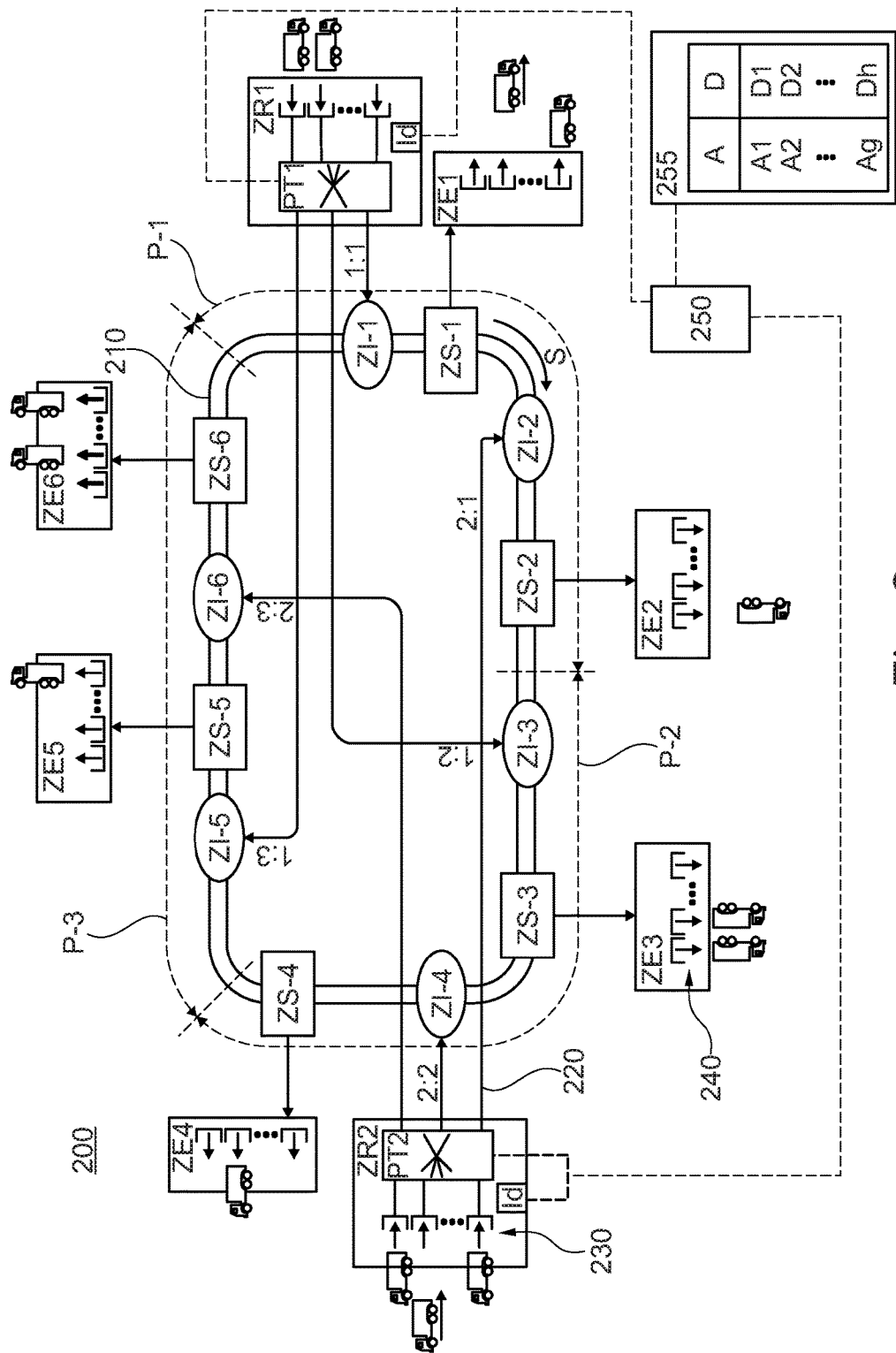
FIG. 2 shows a sorting installation having a looped conveyor of the invention, with two article-receiving zones, separation of the articles to be sorted into two pre-sorted streams per article-receiving zone, and interleaving of injection zones and of outlet zones for articles to be sorted that are received at the two article-receiving zones.

FIG. 2 shows a logistics installation 200 of the invention that includes, for example, two article-receiving zones ZR, namely ZR1 and ZR2, for receiving the non-sorted articles, and six article-dispatching zones ZE, namely ZE1 to ZE6, for dispatching the sorted articles.

The article-receiving zones ZR and the article-dispatching zones ZE include unloading bays 230 for unloading trucks, and loading bays 240 for loading trucks, respectively.

The logistics facility 200 includes a looped conveyor 210, e.g. a platform conveyor, having six injection zones ZI, namely ZI-1 to ZI-6, for injecting the articles onto the conveyor, the six injection zones ZI alternating one-by-one with six outlet zones ZS, namely ZS-1 to ZS-6, for unloading the conveyor.

In this example, the arriving articles are separated into three streams 220 of articles that are pre-sorted by pre-sorting devices PT, namely PT1 and PT2, at each article-receiving zone ZR, namely ZR1 and ZR2, i.e. into six streams 220 in all. The articles that are pre-sorted by a given pre-sorting device PT are distributed between three injection zones ZI via conveyor lines 330 shown in FIG. 3A.

Each stream 220 is identified in FIG. 2 by a pair of numbers p:q, where p indicates the original pre-sorting device of the stream of pre-sorted articles and q indicates a stream number. In this example, for two article-receiving zones each including a pre-sorting device and three streams of pre-sorted articles per pre-sorting device, p is 1 or 2, and q is 1, 2, or 3.

The injection zones ZI and outlet zones ZS are distributed along the conveyor in their numbering order in the direction S of rotation of the conveyor.

Each injection zone ZI-i is situated upstream from and contiguous to an outlet zone ZS-i, where i lies in the range 1 to 6. In this way, each injection zone is contiguous to and is flanked by two outlet zones ZS, and each outlet zone ZS is contiguous to and flanked by two of the injection zones ZI.

In this document, the term "contiguous" applies only to the elements ZI and ZS of the invention, and does not exclude the presence of elements not related to the invention between two of these "contiguous" elements on the conveyor.

In addition, FIG. 2 merely shows one particular situation, and the number of article-receiving zones ZR and of outlet zones ZS is limited merely by practical constraints relating to compactness and/or cost.

In FIG. 2, the injection and outlet zones are arranged so that each stream 220 of pre-sorted articles numbered q, where q=1, 2 or 3, goes from a pre-sorting device p, where p=1 or 2, to an injection zone i, where i represents an integer in the range 1 to 6, and where $i=p+(2\times(q-1))$, which can be generalized to the situation of an arbitrary number of article-receiving zones including P pre-sorting devices, each of which pre-sorts the articles into Q streams, where $i=p+(P\times(q-1))$, and where p lies in the range 1 to P, q lies in the range 1 to Q, and i lies in the range 1 to P×Q.

Thus, in the situation shown in FIG. 2, with three article-receiving zones, two pre-sorted streams per article-receiving zone, and thus six outlet zones, the pre-sorting device PT1 is connected to the injection zones ZI-1, ZI-3 and ZI-5, it being possible for the pre-sorting to be performed in such a manner that the parcels injected at ZI-1 are unloaded at ZS-1 or ZS-2, the parcels injected at ZI-3 are unloaded at ZS-3 or ZS-4, and the parcels injected at ZI-5 are unloaded at ZS-5 or ZS-6, and the pre-sorting device PT2 is connected to the injection zones ZI-2, ZI-4 and ZI-6, it being possible for the pre-sorting to be performed in such a manner that the parcels injected at ZI-2 are unloaded at ZS-2 or ZS-3, the parcels injected at ZI-4 are unloaded at ZS-4 or ZS-5 and the parcels injected at ZI-6 are unloaded at ZS-6 or ZS-1. In other words, each pre-sorting device is connected to a single injection zone every two injection zones considered sequentially along the conveyor in the direction of rotation of the conveyor, and the stream presented to each article-receiving zone may be sorted into all of the outlet zones.

The looped conveyor is made up of subdivisions P that are contiguous in pairs, each subdivision including injection zones ZI that are collectively connected to each of the article-receiving zones by conveyor lines 330.

In FIG. 2, a first subdivision P-1 includes the injection zones ZI-1 and ZI-2, a second subdivision P-2 includes the injection zones ZI-3 and ZI-4, and a third subdivision P-3 includes the injection zones ZI-5 and ZI-6. In this way, each of the subdivisions P is connected to each of the article-receiving zones ZR1 and ZR2 via conveyor lines 330.

The article-receiving zones ZR are equipped with article detection and identification devices Id for detecting and identifying the articles unloaded from the trucks, and with pre-sorting devices PT for pre-sorting the identified articles in such a manner as to separate them into three streams 220 as a function of their identifications and of a sorting plan that is prepared in advance.

Figure 3A:
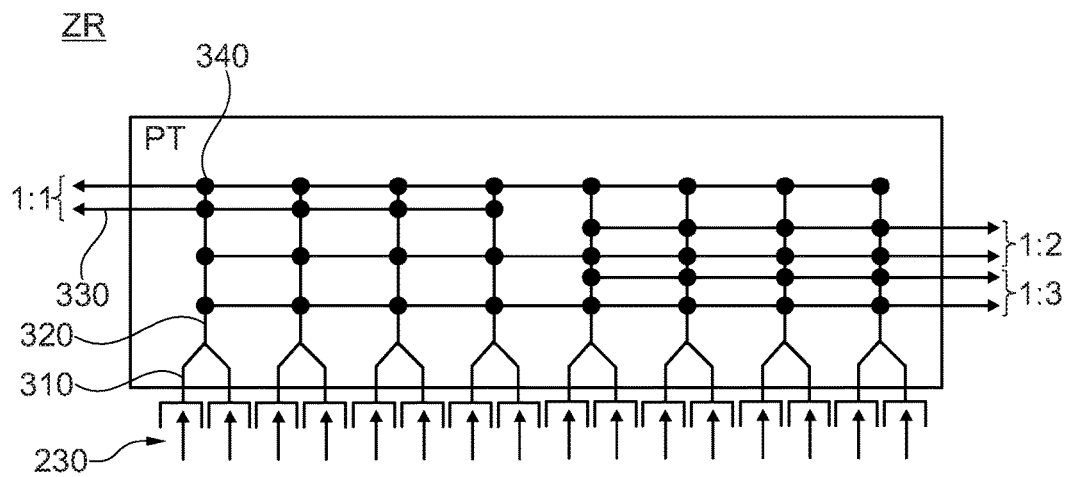
FIG. 3A shows an article-receiving zone of FIG. 2, and the associated pre-sorting device.

Each stream 220 is taken charge of by one or more conveyor lines 330 (depending on the desired throughput rate) that are shown in FIG. 3A. Each conveyor line connects one of the pre-sorting devices PT to an injection point of one of the injection zones ZI. The detection and identification devices may be optical readers for reading barcodes or square barcodes ("QR" codes), optical sensors equipped with optical character recognition systems, or indeed detectors for detecting radiofrequency identification (RFID) tags.

FIG. 3A shows a pre-sorting device PT included in an article-receiving zone ZR for pre-sorting the articles received at the unloading bays 230.

The articles are placed on conveyors 320 by handling means 310, and then routed onto the conveyor lines 330 by routing devices 340. By way of example, the conveyors 320 and the conveyor lines 330 may be platform, belt, or roller conveyors. The handling means may involve manual positioning of the articles by operatives, or they may be automated unloading systems. In this illustration, each of the three streams 1:1, 1:2, and 1:3 is taken charge of by two conveyor lines 330, but this example is not limiting.

Figure 3B:
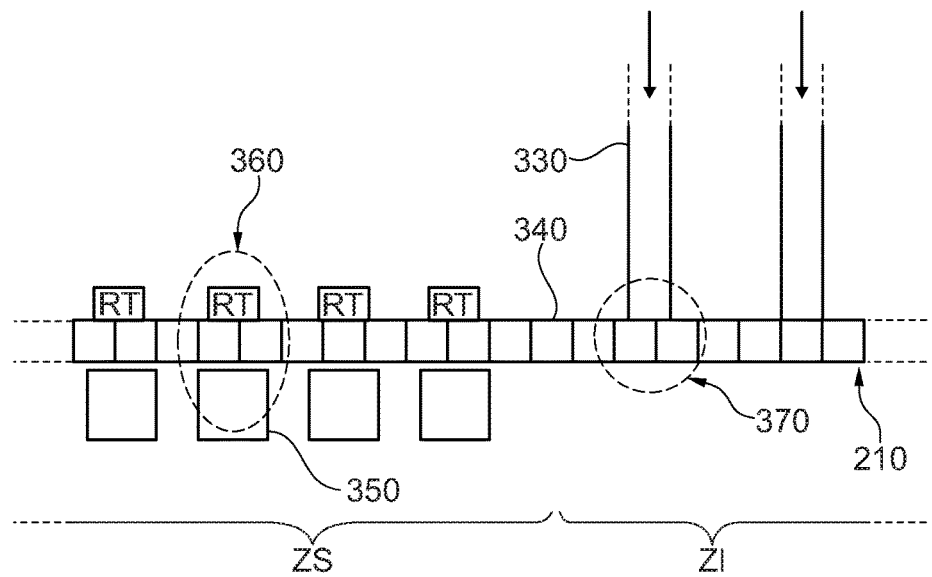
FIG. 3B shows portions of a sorting zone and of an injection zone of the looped conveyor of FIG. 2.

FIG. 3B shows the outlet zones ZI, which include outlet points 360 at which the articles are unloaded from the looped conveyor 340 by outlet routing devices RT.

The routing device is designed to steer the articles towards outlets, and may, for example, consist of a platform tipper device for tipping the platforms 340 of the conveyor 210 so as to cause the articles to fall into article-receiving trays 350 forming the outlets. The trays may be replaced by other types of container or of support, such as cardboard boxes, pallets, trolleys, or shuttles.

After the sorting, the articles are transported in the trays to dispatching zones ZE at which the loading bays 240 are situated so as to be re-dispatched by truck. A monitoring and control unit 250 is connected to a database 255 listing g articles A, namely A1 to Ag, to be sorted within a given period, and associating them, for example, with destinations D, namely D1 to Dh. g and h represent positive integer numbers.

The monitoring and control unit 250 is connected to the detection and identification devices Id and controls the pre-sorting devices PT of the article-receiving zones ZR and the routing devices RT of the outlet zones ZS.

Efficient sorting of the articles is based on a good balance of the article throughput rates between the outlet zones ZS. Knowing in advance the articles A to be sorted and their sorting information D, such as their destinations, makes it possible to assign the destinations to the sorting outlet zones and to control the pre-sorting devices of the article-receiving zones and the routing devices of the outlet zones in such a manner as to balance the throughput rates at the outlet zones.

Naturally, criteria other than the destinations may be used to do the sorting.

Figure 4:
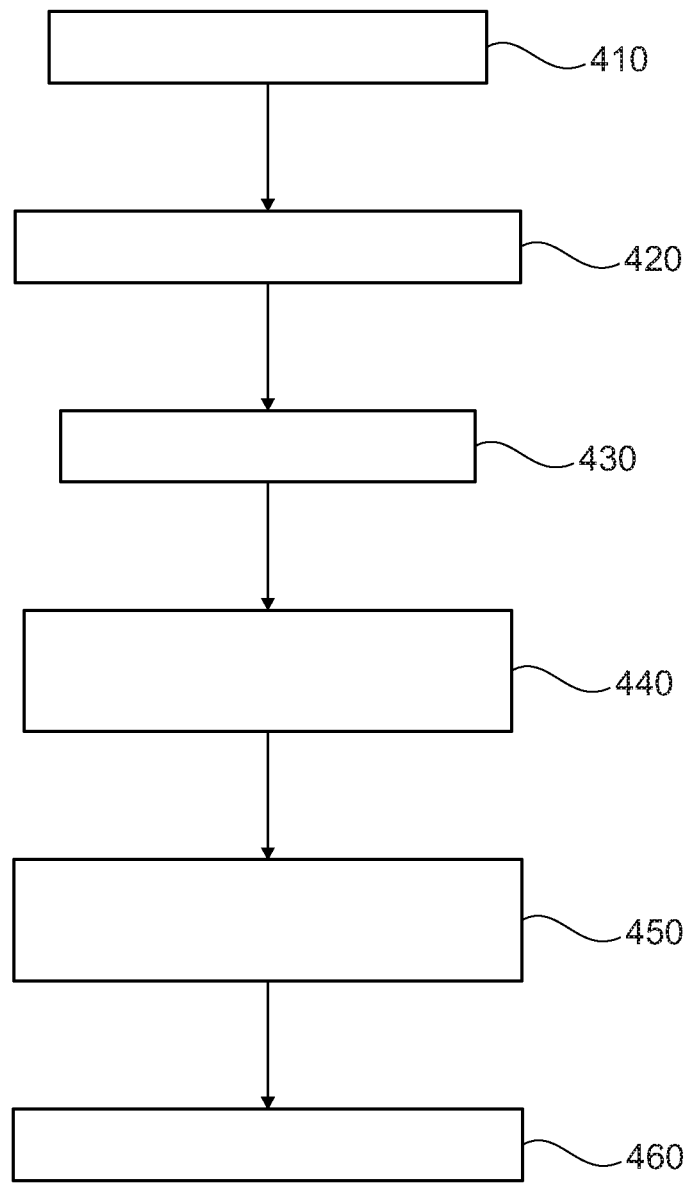
FIG. 4 shows the steps of a method of sorting using the sorting installation of FIG. 2.

For a given period, a protocol for using the logistics facility 200 is as follows, as shown in FIG. 4.

In a step 410, the data relating to the articles A to be sorted during the period and to their destinations D is received and stored in the database 255.

In a step 420, the monitoring and control unit 250 accesses the data in the database and draws up a sorting plan for the period as a function of the volumes of articles to be taken to each of the destinations: one or more destinations D are assigned to each outlet zone ZS and to each outlet point 360. This assignment defines the sorting plan.

A method of assigning the destinations of the articles to the outlet zones as a function of the number of articles to be taken to each destination is as follows.

Firstly, the destinations are classified in decreasing order of the number of articles that are to be taken thereto.

If 25 destinations D are concerned, they can thus be classified from 1 to 25, i.e. from D01 to D25. The destinations are then assigned to the n outlet zones of the conveyor by oscillation: the first n destinations are assigned to the first n outlet zones, respectively.

The destinations (n+1) to 2n are assigned to the outlets in the reverse order of the first n destinations, and so on. In the situation shown in FIG. 2, with 6 outlet zones, the destinations 1 to 6 are assigned respectively to the outlet zones 1 to 6, the destinations 7 to 12 are assigned to the outlet zones 6 to 1, the destinations 13 to 18 are assigned to the outlet zones 1 to 6, the destinations 19 to 24 are assigned to the outlet zones 6 to 1, and the destination 25 is assigned to the outlet zone 1.

The associations formed are then (D01, ZS-1), (D02, ZS-2), (D03, ZS-3), (D04, ZS-4), (D05, ZS-5), (D06, ZS-6), (D07, ZS-6), (D08, ZS-5), (D09, ZS-4), (D10, ZS-3), (D11, ZS-2), (D12, ZS-1), (D13, ZS-1), (D14, ZS-2), (D15, ZS-3), (D16, ZS-4), (D17, ZS-5), (D18, ZS-6), (D19, ZS-6), (D20, ZS-5), (D21, ZS-4), (D22, ZS-3), (D23, ZS-2), (D24, ZS-1) and (D25, ZS-1).

The outlet zones are assigned to the destinations before the articles arrive at the sorting center.

After they have been received in the article-receiving zones ZR during a step 430, the articles are detected and identified by the identification devices Id during a step 440.

The monitoring and control unit then controls the pre-sorting and routing devices of the outlet zones as a function of the identification of the articles, in such a manner that they are taken to the appropriate injection and outlet zones via the conveyor lines during a step 450. The sorted articles are conveyed to the article-dispatching zones so as to be dispatched to their destinations, which constitutes the step 460.

In accordance with the invention, the monitoring and control unit 250 is configured so that the destinations are assigned to the outlet zones ZS and the pre-sorting devices PT of the article-receiving zones ZR and the routing devices RT of the outlet zones ZS are controlled in such a manner that an article coming from a given article-receiving zone ZR and injected onto the conveyor 210 via a first injection zone ZI is unloaded from the conveyor 210 before going through a second injection zone ZI coming from the given article-receiving zone ZR.

In addition, the article throughput rates in the outlet zones ZS should be balanced.

In the example shown in FIG. 2, articles received in the reception zone ZR-1 are injected onto the conveyor via one of the injection zones ZI-1, ZI-3 and ZI-5. The articles injected via the injection zone ZI-1 are unloaded from the conveyor via one of the outlet zones ZS-1 and ZS-2, in such a manner that the locations of the conveyor that are used are vacated and can receive new articles via the injection zone ZI-3.

Similarly, the articles injected via the injection zone ZI-3 are unloaded from the conveyor via one of the outlet zones ZS-3 and ZS-4, and the articles injected via the injection zone ZI-5 are unloaded from the conveyor via one of the outlet zones ZS-5 and ZS-6. Generalized to the situation where there is a number n of outlet zones and of inlet zones, the monitoring and control unit controls the pre-sorting devices PT and the routing devices RT of the outlet zones ZS in such a manner that an article coming from a given article-receiving zone ZR and injected onto the conveyor via a first injection zone ZI is unloaded from the conveyor before going through a second injection zone ZI connected to the given article-receiving zone ZR by one of the conveyor lines 330.

With the above formalism, the matrix A corresponding to this architecture and to this method of operation is as follows:

$$A = \begin{bmatrix} \frac{1}{2} & \frac{1}{2} & 0 & 0 & 0 & 0 \\ 0 & \frac{1}{2} & \frac{1}{2} & 0 & 0 & 0 \\ 0 & 0 & \frac{1}{2} & \frac{1}{2} & 0 & 0 \\ 0 & 0 & 0 & \frac{1}{2} & \frac{1}{2} & 0 \\ 0 & 0 & 0 & 0 & \frac{1}{2} & \frac{1}{2} \\ \frac{1}{2} & 0 & 0 & 0 & 0 & \frac{1}{2} \end{bmatrix}$$

and the multiplier M3 is equal to 4.

The multiplier M3=4 of this configuration having two article-receiving zones and three pre-sorted streams per article-receiving zone is equal to the product of the multiplier M1=3 of the configuration having one article-receiving zone and three pre-sorted streams multiplied by the multiplier M2=4/3 of the configuration having two article-receiving zone with interleaving of the injection and outlet zones.

By means of this architecture, that combines pre-sorting and interleaving, the multipliers of the architectures with pre-sorting and with interleaving are multiplied by each other.

Thus, the present invention offers a way of optimizing looped conveyors incorporated into a sorting installation.

What is claimed is:

1. A logistics installation for sorting articles, the installation comprising:
   a looped conveyor for conveying articles according to a direction of rotation, said looped conveyor comprising injection zones and sorting outlet zones alternately distributed along the conveyor, said injection zones being arranged to inject the articles onto the conveyor and said looped conveyor being arranged to unload the articles into the sorting outlet zones;
   P pre-sorting devices, each pre-sorting device is being designed for pre-sorting the articles to be sorted by the looped conveyor into a plurality of injection zones, P being an integer greater than or equal to two; and conveyor lines for conveying the pre-sorted articles from the pre-sorting devices to the injection zones, the conveyor lines being arranged so that each injection zone is connected to one pre-sorting device only and each pre-sorting device is connected to a plurality of injection zones in a configuration in which each pre-sorting device is connected to one in every P injection zones considered sequentially along the conveyor in a given direction, said installation further comprising a monitoring and control unit using a sorting plan that associates the outlet zones with the articles, said monitoring and control unit being designed to control, based on the sorting plan, each pre-sorting device in order to sort articles in injection zones, to which said pre-sorting device is connected, so that each article being injected on the conveyor from a given injection zone is unloaded in a sorting outlet zone before going through another injection zone that is connected to said given pre-sorting device in the direction of rotation of the conveyor, and, said monitoring and control unit being further designed to control, based on the sorting plan, the unloading of the articles into a given sorting outlet zone arranged between two injection zones connected to a given pre-sorting device.

2. The logistics installation according to claim 1, wherein the sorting information is constituted by delivery addresses.

3. The logistics installation according to claim 2, wherein the looped conveyor is made up of subdivisions that are connected together end-to-end, each subdivision including the same number of injection zones and of outlet zones, the injection zones of each subdivision being collectively connected to each of the article-receiving zones via the conveyor lines.

4. The logistics installation according to claim 3, wherein each pre-sorting device is designed to separate the non-sorted articles into Q streams of pre-sorted articles conveyed by the conveyor lines, where Q is an integer greater than or equal to 2;
the looped conveyor includes I injection zones, where $I=P \times Q$, the injection zones being numbered from 1 to I and being disposed in that order around the conveyor in a direction S of rotation of the conveyor; and
a stream numbered q, where q lies in the range 1 to Q, goes from a pre-sorting device numbered p, where p lies in the range 1 to P, and leads to the injection zone i, where $i=p+(P \times (q-1))$.

5. The logistics installation according to claim 4, wherein the looped conveyor is a platform conveyor.

6. The logistics installation according to claim 5, wherein the articles are mailpieces or parcels.

7. The logistics installation according to claim 1, wherein the sorting information is constituted by delivery addresses.

8. The logistics installation according to claim 1, wherein the looped conveyor is made up of subdivisions that are connected together end-to-end, each subdivision including the same number of injection zones and of outlet zones, the injection zones of each subdivision being collectively connected to each of the article-receiving zones via the conveyor lines.

9. The logistics installation according to claim 8, wherein each pre-sorting device is designed to separate the non-sorted articles into Q streams of pre-sorted articles conveyed by the conveyor lines, where Q is an integer greater than or equal to 2;
the looped conveyor includes I injection zones, where $I=P \times Q$, the injection zones being numbered from 1 to I and being disposed in that order around the conveyor in a direction S of rotation of the conveyor; and
a stream numbered q, where q lies in the range 1 to Q, goes from a pre-sorting device numbered p, where p lies in the range 1 to P, and leads to the injection zone i, where $i=p+(P \times (q-1))$.

10. The logistics installation according to claim 1, wherein each pre-sorting device is designed to separate the non-sorted articles into Q streams of pre-sorted articles conveyed by the conveyor lines, where Q is an integer greater than or equal to 2;
the looped conveyor includes I injection zones, where $I=P \times Q$, the injection zones being numbered from 1 to I and being disposed in that order around the conveyor in a direction S of rotation of the conveyor; and
a stream numbered q, where q lies in the range 1 to Q, goes from a pre-sorting device numbered p, where p lies in the range 1 to P, and leads to the injection zone i, where $i=p+(P \times (q-1))$.

11. The logistics installation according to claim 1, wherein the looped conveyor is a platform conveyor.

12. The logistics installation according to claim 1, wherein the articles are mailpieces or parcels.

* * * * *